United States Patent Office

2,980,659
Patented Apr. 18, 1961

2,980,659

COPOLYMERIZATION PROCESS

Donald R. Witt, Bartlesville, Okla., assignor to Phillips Petroleum Company, a corporation of Delaware No Drawing. Filed Jan. 13, 1958, Ser. No. 708,349

10 Claims. (Cl. 260—88.2)

This invention relates to a process for the production of an improved, normally solid copolymer. In one aspect it relates to a novel catalyst for the production of normally solid copolymers. In another aspect it relates to a process for the production of such a catalyst.

In the production of extruded and molded articles from hydrocarbon polymers and copolymers, it is sometimes desirable to have a polymer or copolymer which is readily processable, i.e. which flows rapidly at moderate temperatures into a mold or through an extrusion orifice or similar equipment. Such polymers and copolymers are particularly desirable where large articles, such as plastic wastebaskets and the like, are manufactured by extrusion or molding.

An object of the present invention is to provide an improved process for the production of readily processable, normally solid, hydrocarbon copolymers. Another object of the invention is to provide an improved composite catalyst. Another object is to produce a normally solid hydrocarbon copolymer having a high melt index. Another object is to produce a copolymer having a high resistance to environmental stress cracking. Other objects and advantages will become apparent to one skilled in the art on reading this disclosure.

According to one embodiment of this invention, improved, normally solid, hydrocarbon copolymers are produced by copolymerizing two different olefins in the presence of a catalyst comprising chromium oxide, in which at least part of the chromium is hexavalent, and at least one oxide selected from the group consisting of nickel, cobalt, and manganese, oxides, the oxides being supported on silica-alumina.

According to another embodiment of the invention, there is provided a catalyst wherein the major component or support is silica-alumina and the minor components are chromium oxide and manganese oxide, at least part of the chromium in the catalyst being in the hexavalent state.

According to another embodiment of the invention, an improved catalyst is prepared by depositing chromium oxide and manganese oxide upon a silica-alumina support or carrier and treating the resulting composite to leave at least part of the chromium in the hexavalent state.

The terms "support," "base" or "carrier" as used herein in connection with catalysts are considered synonymous and are not to be narrowly construed; the support (or base, or carrier) is not necessarily a mere inert component of the catalyst but apparently contributes an essential part of the catalytic activity to the catalyst.

The starting materials utilized for the copolymerization process according to this invention are a major proportion of ethylene and a minor proportion of an aliphatic olefin having from 3 to 8 carbon atoms per molecule. Preferably, the latter-mentioned olefin is an aliphatic 1-olefin. Still more preferably, the aliphatic 1-olefin is a monoolefin having no chain branching nearer the double bond than the 4-position. Examples of preferred monoolefins which can be copolymerized with ethylene according to this invention are propylene 1-butene, 1-pentene, 1-hexene, 1-octene, 4-methyl-1-pentene, and 4-methyl-1-hexene. The amount of the minor comonomer, or olefin other than ethylene, present is ordinarily within the range 5 to 25 weight percent, based on total olefins. Preferably, the concentration of comonomer is within the range 10 to 20 weight percent.

The catalyst according to this invention comprises, as a major component (or support, base, or carrier), a silica-alumina complex or composite. The carrier is preferably utilized in the form of a porous gel, preferably containing a large proportion of macropores. The carrier can suitably be a silica-alumina composite or complex of the type known in the art for use as cracking catalysts. Preferably, the alumina content is less than 50 percent and preferably less than 25 percent, although composites which contain a major proportion of alumina are operative. The silica-alumina composites can be prepared by any of the methods, e.g. coprecipitation or impregnation, which are known in the prior art. Since the separation of these silica-alumina composites is well known, further details need not be given herein. These composites are sometimes alternatively referred to in the art as "synthetic alumino-silicates." Silica-alumina composites containing additional components can also be used as carriers according to this invention. Thus composites such as silica-alumina-magnesia and silica-alumina-zirconia can be utilized.

In order to produce high yields of solid copolymer, it is essential that the catalyst contain an appreciable amount of chromium oxide. It is further essential that at least part of the chromium be in the hexavalent state at the initial contacting of hydrocarbon with catalyst. The total chromium concentration in the catalyst can range from approximately 0.1 weight percent to as high as 50 or more weight percent. However, as a practical matter, the chromium content of the catalyst is ordinarily within the range 0.1 to 10 weight percent. The hexavalent chromium content of the catalyst is preferably at least 0.1 weight percent, based on total catalyst weight, and is determined by extracting the catalyst with water and determining the amount of chromium thus dissolved in the water. The chromium determination can be conducted by any of the well known procedures utilized by the analytical chemist.

The catalyst according to this invention contains, as an additional minor component, at least one oxide selected from the group consisting of nickel, cobalt, and manganese oxides. Although the total content of chromium plus the additional metal in the form of oxide can range up to 50 percent or more of the total catalyst weight, the total of the chromium plus additional metal (both present as oxides) is ordinarily in the range from 0.5 to 10 percent of the total catalyst weight. Preferably the total amount of metals deposited as oxides on the silica-alumina is in the range 1 to 5 weight percent of the total catalyst weight. Although the ratio of chromium oxide to the additional oxide can vary over a wide range, it is preferred that the weight ratio of chromium to additional metal(s) (i.e. nickel, cobalt, and/or manganese) be within the range 5:1 to 1:3, preferably 3:1 to 1:1.

The catalyst can be prepared by any of the procedures known in the catalyst preparation art, provided always that the catalyst must finally contain hexavalent chromium. Thus the catalyst can be prepared by grinding together the various oxides in the desired proportions. However, I have found that a highly satisfactory, and often preferred, catalyst can be prepared by impregnating the base or carrier, i.e. silica-alumina, with an aqueous solution of a compound of chromium and a compound of manganese, for example, which compounds are ignitable to the oxides on heating. The catalyst can be prepared by impregnating the base first with the chromium compound and igniting, and then impregnating the resulting composite with an aqueous solution of the manganese compound and igniting. However, it is convenient to impregnate the base by utilizing an aqueous solution containing both a chromium compound and a manganese, nickel or cobalt compound of the type described. The aforementioned ratio of chromium to other supported metal can be obtained by adjusting the concentration of the aqueous solution so that the weight ratio of chromium to other metal in said solution is approximately the ratio ultimately desired in the catalyst. Any of the compounds of the catalytic metals herein described can be utilized, provided the compounds are ignitable to an oxide. Even insoluble compounds such as the carbonates, hydroxides, or hydrous oxides, can be utilized, generally in the form of their suspensions, rather than solutions, in water. However, it is generally preferred, for the sake of convenience, to use a soluble compound. Suitable compounds of chromium are chromium trioxide, chromic nitrate, chromic acetate, and ammonium chromate. Regarding the compound of nickel, cobalt, or manganese, the nitrates are generally preferred on account of their ready ignitability to oxides and their solubility in water. More complex compounds, such as potassium permanganate, potassium cobaltinitrite, or nickel or cobalt ammines ignitable to oxides, can be used if desired. The halides and sulfates of chromium, manganese, nickel or cobalt can be utilized, since it appears that upon ignition, especially in the presence of the residual water remaining after draining off excess solution, oxides or basic oxygen-containing compounds of these metals are formed. However, as previously stated, the preferred compounds for impregnation purposes are chromium trioxide, chromic nitrate and the nitrates of nickel, cobalt and manganese, because of their facility of calcination completely to oxides. In impregnating the carrier, the concentration of the impregnating solution and the amount thereof with respect to the amount of the carrier can be varied over a wide range. The concentration will depend, to some extent, upon the particular technique used. The aqueous solution of the compounds of chromium and additional metal can be sprayed onto the surface of the carrier, or the carrier can be immersed in the aqueous solution. In the latter technique, the excess solution is drained off and the impregnated solid is allowed to dry. I have found that satisfactory results are obtained when a concentration of the order of 0.5 to 5 molar with respect to each of the catalytic metal compounds is utilized and the carrier, i.e. silica-alumina, is immersed in this solution, allowed to remain for a time of the order of 5 to 30 minutes and the excess liquid is drained off.

The impregnated carrier can be dried by any suitable method such as contacting with a stream of warm gas, indirect heating with combustion gases, heating in an electric oven or furnace, or infrared irradiation. The drying is ordinarily conducted at a temperature in the range 212 to 350° F. Ordinarily a period of about 2 to 4 hours is sufficient for the drying step. Drying in vacuum can be utilized if desired.

In order to insure the presence of hexavalent chromium in the catalyst, e.g. when a trivalent compound such as chromic nitrate is used to prepare the catalyst, it is desirable that the final treatment of the catalyst be an activation step at elevated temperature. This temperature is generally in the range 350 to 1500° F., preferably 450 to 1500° F. and more preferably 750 to 1500° F. The time of activation can range from a few seconds at a temperature of the order of 1500° F. to several hours at temperatures of the order of 450 to 500° F. Ordinarily, a period of time in the range 1 to 25 hours is sufficient. It is desirable that the activation be conducted in a nonreducing atmosphere. Reducing agents such as carbon monoxide and hydrogen can be present during the activation, but their presence is definitely undesirable, and if they are present, their concentration and the time of heating, as well as the temperature of heating, must be carefully regulated so that not all of the chromium is reduced below the hexavalent state. It is preferred that reducing gases be absent. The activation step can be carried out in the presence of inert gases such as nitrogen, helium, argon, or carbon dioxide, or in a vacuum. It is preferred, however, to conduct the activation in an atmosphere containing free oxygen. Air is the atmosphere generally preferred on account of convenience, although pure oxygen and oxygen-enriched air are satisfactory. It is preferred that the atmosphere for the activation be dry or substantially anhydrous, i.e. that it have a dew point not greater than 5° F. and preferably not greater than 0° F. The presence of appreciable amounts of moisture tends to promote the decomposition of hexavalent chromium compounds in the catalyst and consequent deactivation of the catalyst. Moisture can be removed from the activation gas by any of the methods well known in the art of gas drying, e.g. refrigeration, contacting with adsorbents such as silica gel, or with desiccants such as sulfuric acid or calcium chloride.

The copolymerization is generally conducted at a temperature in the range 100 to 325° F. Preferably the reaction temperature is in the range 150 to 325° F. and more preferably 175 to 275° F.

The copolymerization can be conducted in the gaseous phase, with or without an inert gaseous diluent. Alternatively, and usually preferably, the copolymerization is conducted in the presence of a liquid hydrocarbon, as a diluent, which is substantially inert or nonreactive under the polymerization conditions. For this purpose, saturated hydrocarbons are definitely preferred on account of their inertness. These include paraffins, preferably those having from 3 to 12 carbon atoms per molecule, and naphthenes, preferably those containing from 5 to 8 carbon atoms per molecule. Specific diluents are propane, isobutane, normal butane, isopentane, normal pentane, neopentane, normal hexane, the isohexanes, the heptanes, and the octanes. Suitable naphthenic diluents include cyclopentane, methylcyclopentane, the dimethylcyclopentanes, cyclohexane, methylcyclohexane, and the dimethylcyclohexanes. Aromatic hydrocarbons can be used, but are not preferred, since they (or impurities therein) appear to decrease the activity of the catalyst.

Only moderately elevated pressures are required when a diluent is used. Spesifically, the pressure need be only sufficient to maintain the diluent substantially in the liquid phase. Although much higher pressures can be used, they are generally unnecessary. Maximum efficiency of copolymerization occurs at pressures in the range 150 to 350 p.s.i.g. The contacting of the olefinic feed with the catalyst can be effected according to any of the techniques known in the prior art. Thus the catalyst can be utilized in the form of a fixed bed or a gravitating bed. Alternatively, and often preferably, the catalyst is utilized in a mobile state. A satisfactory method of operation comprises preparing a suspension of the finely divided catalyst (e. g. 100 mesh and finer) in the liquid hydrocarbon diluent, feeding the suspension to a pressure-type reactor provided with a stirrer, simultaneously supplying the comonomeric olefins to the reactor, maintaining the reactor under conditions previously described, for example, a temperature of 250° F. and a pressure of 250 p.s.i.g., allowing a suitable residence time for the copolymerization, ordinarily in the range 15 minutes to 5 hours, continuously withdrawing the reaction mixture from the reaction zone, heating the withdrawn mixture to a temperature of 300° F., for example, flashing off unreacted olefin at this temperature, and agitating the remaining liquid to insure maximum dissolution of the product copolymer, removing the catalyst by filtration, centrifugation or equivalent method, and recovering the copolymer from the filtrate. The recovery can be effected by cooling the filtrate, e.g. to room temperature or somewhat higher, so that the copolymer precipitates, or by vaporizing the solvent. The used catalyst can be regenerated by removing deposited organic matter by oxidation and the oxidized catalyst can then be returned to the reactor. However, the catalyst is sufficiently active and exhibits a sufficiently high productivity that regeneration is ordinarily not necessary and it is economical to discard the catalyst after one pass through the reactor.

As previously indicated, it is essential that the catalyst contain at least part of its chromium in the hexavalent state at the initial contacting of the catalyst with hydrocarbon, i.e. the diluent or the olefin feed.

The two olefins to be copolymerized can be supplied to the reactor in the desired amounts as a mixture, or they can be individually supplied so that the ratio thereof can be varied as desired.

The feed materials according to this invention should be purified and maintained free from water, hydrogen, carbon monoxide, oxygen, sulfur compounds and halogen compounds, since the presence of these materials in the feed decreases the activity of the catalyst.

In a series of runs constituting specific embodiments of my invention, ethylene and 1-butene in the proportions indicated in the following tabulation were contacted with a catalyst comprising chromium oxide and a second oxide indicated in the following table. The chromium content of the catalyst was 2.5 weight percent. The percentage of additional element, i.e. manganese, cobalt, or nickel, in the form of oxide, was 1.25 weight percent. The catalyst was prepared by impregnating a porous silica-alumina gel (about 100 mesh and finer) containing 13 weight percent alumina and the remainder silica with an aqueous solution of chromium trioxide and the nitrate of the second metal, i.e. manganous, nickelous, or cobaltous nitrate. The aqueous solution had a concentration of approximately 0.3 molar with respect to chromium trioxide and approximately 0.15 molar with respect to the second metal nitrate. After immersion of the silica-alumina in the aqueous solution for approximately 30 minutes, the excess aqueous solution was drained away and the impregnated silica-alumina was dried at approximately 300° F. The catalyst was then heated at a temperature of 1400° F. for a period of 5 hours in air having a dew point below 0° F. At least about half of the chromium in the catalyst was in the hexavalent state.

A suspension of approximately 1 weight percent of the catalyst in sulfuric acid-purified cyclohexane was charged to a reactor provided with a rotary, motor-driven stirrer operated at 200 r.p.m. The catalyst was maintained in suspension in the cyclohexane by means of the stirrer. A solution of 1-butene in cyclohexane and a stream of ethylene gas were then simultaneously charged to the reactor which was maintained at 250° F. The pressure was maintained at 250 p.s.i.g. throughout the runs. The reactor effluent was heated to 275° F. to insure dissolution of the copolymer, the catalyst was removed by filtration, and the copolymer was recovered by vaporization of the cyclohexane. The results obtained are shown in the following tabulation:

| Second metal oxide | Manganese | Cobalt | Nickel | None |
| --- | --- | --- | --- | --- |
| 1-Butene in feed, wt. percent | 14 | 15 | 15 | 13 |
| Polymer yield, gm./gm. catalyst | 494 | 1,110 | 634 | 1,271 |
| 1-Butene units in copolymer, wt. percent | 12.6 | 11.8 | 10.9 | 9.9 |
| Intrinsic viscosity of copolymer [1] | 0.896 | 1.13 | 0.78 | 1.233 |
| Melt index [2] | 27.7 | 12.0 | 28.5 | 7.57 |
| Density, gm./cc., 25° C | 0.921 | 0.915 | 0.917 | 0.920 |
| Izod impact strength, ¼″ x ¼″ bars, ft.-lb./in. notch [3] | 6.4 | 8 | 6.4 | 8.5 |
| Stiffness, p.s.i. ×10⁻³ [4] | | 24 | 34 | 34 |
| Tensile strength, p.s.i. [5] | 1,600 | 1,260 | 1,390 | 1,570 |
| Percent Elongation [5] | 49 | 49 | 34 | 43 |

[1] Measured at 130° C.; solution of 0.2 gm. copolymer in 50 cc. tetralin.
[2] ASTM D-1238-52T.
[3] ASTM D-256-47T. Samples did not break.
[4] ASTM D-747-50.
[5] ASTM D-412-51T. Compression-molded samples.

The foregoing results show that when an oxide of manganese, cobalt or nickel was present in the catalyst, together with hexavalent chromium, an increased amount of the 1-butene comonomer was incorporated into the copolymer. Furthermore, the resulting copolymer had an increased melt index. Melt index is an indication of the facility with which the polymer flows through an extrusion orifice and is an indication of the ease of processability of the copolymer. Thus, copolymers having improved processability are obtained in accordance with my invention as illustrated in the foregoing tabulation. In addition, these copolymers are highly resistant to environmental stress cracking.

Similar results are obtained when propylene or 1-pentene is substituted for 1-butene in the foregoing runs.

While certain compositions, process steps, and examples have been shown for purposes of illustration, it is clear that the invention in not limited thereto.

It should be noted that the percentages of chromium, nickel, cobalt, and manganese in the catalysts discussed in the specification or stated in the claims are weight percentages of the element, even though said element is present in the form of its oxide or oxides in the catalyst. Percentages of the carrier components, however, are percentages of the oxides.

It is also within the scope of this invention to utilize a catalyst prepared by depositing chromium oxide on one portion of silica-alumina, depositing one or more oxides of manganese, nickel, or cobalt on a separate portion of silica-alumina, and mixing the separate composites thus prepared. The drying or calcination can be applied to the resulting mixture or to the said separate composites prior to mixing.

I claim:

1. A process which comprises copolymerizing a major proportion of ethylene with a minor proportion of an aliphatic olefin having from 3 to 8 carbon atoms per molecule, at a temperature in the range of 100 to 325° F., with a catalyst consisting essentially of silica-alumina as a major component and, as minor components, chromium oxide and at least one oxide selected from the group consisting of manganese, cobalt, and nickel oxides, at least part of the chromium being in the hexavalent state.

2. A process which comprises copolymerizing a major proportion of ethylene with a minor proportion of an aliphatic 1-olefin having from 3 to 8 carbon atoms per molecule, at a temperature in the range 150 to 325° F., with a catalyst consisting essentially of silica-alumina as a major component and, as minor components, chromium oxide and at least one oxide selected from the group consisting of manganese, cobalt, and nickel oxides, at least part of the chromium being in the hexavalent state at the initial contacting with hydrocarbon.

3. A process which comprises copolymerizing an olefinic mixture comprising from 5 to 25 weight percent of an olefin selected from the group consisting of propylene and 1-butene and the remainder ethylene, at a temperature in the range 150 to 325° F., with a catalyst consisting essentially of silica-alumina as a major component and, as minor components, chromium oxide and at least one oxide selected from the group consisting of manganese, cobalt, and nickel oxides, at least part of the chromium being in the hexavalent state at the initial contacting with hydrocarbon.

4. A process which comprises copolymerizing a major proportion of ethylene with a minor proportion of an aliphatic 1-olefin having from 3 to 8 carbon atoms per molecule and no branching nearer the double bond than the 4-position, at a temperature in the range 150 to 325° F., with a catalyst prepared by depositing chromium oxide and at least one oxide selected from the group consisting of manganese, cobalt, and nickel oxides on a silica-alumina support and calcining in a nonreducing anhydrous atmosphere at a temperature in the range 350 to 1500° F. to impart polymerization activity to said catalyst and result in at least part of the chromium being in the hexavalent state, and recovering a normally solid copolymer.

5. A process according to claim 4 wherein the metals deposited as oxides on said support amount to a total of from 0.5 to 10 weight percent of the total catalyst and the weight ratio of chromium to metal present as oxide selected from said group is from 5:1 to 1:3.

6. A process according to claim 4 wherein the metals deposited as oxides on said support amount to a total of from 1 to 5 weight percent of said catalyst and the weight ratio of chromium to metal present as oxide selected from said group is from 3:1 to 1:1.

7. A process which comprises copolymerizing a major proportion of ethylene with from 10 to 20 weight percent, based on total olefin, of an olefin selected from the group consisting of propylene and 1-butene, at a temperature in the range 175 to 275° F., in the presence of a saturated hydrocarbon diluent, at a pressure sufficient to maintain said diluent substantially in the liquid phase, with a catalyst prepared by impregnating a silica-alumina support with an aqueous solution of a compound of chromium and a compound of at least one metal selected from the group consisting of manganese, cobalt, and nickel, said compounds of chromium and a metal selected from the group consisting of manganese, cobalt, and nickel being compounds which are ignitable to oxide upon heating, drying the impregnated silica-alumina, and calcining the dried composite in substantially anhydrous air at a temperature in the range 750 to 1500° F. to activate the resulting catalyst and result in at least part of the chromium being in the hexavalent state, the total content of said metals in said catalyst being in the range 1 to 5 weight percent and the weight ratio of chromium to metal selected from said group being in the range 3:1 to 1:1, and recovering a normally solid copolymer.

8. A process which comprises copolymerizing ethylene with 1-butene, the amount of 1-butene present being in the range 10 to 20 weight percent based on total olefin, at a temperature in the range 175 to 275° F., in the presence of cyclohexane at a pressure in the range 150 to 350 p.s.i., with a catalyst prepared by impregnating a silica-alumina support with an aqueous solution of manganous nitrate and chromium trioxide, drying, and calcining in substantially anhydrous air at a temperature in the range 750 to 1500° F. to activate said catalyst and result in at least part of the chromium being in the hexavalent state, the total content of chromium plus manganese in said catalyst being in the range 1 to 5 weight percent, the weight ratio of chromium to manganese being in the range 3:1 to 1:1, the catalyst containing at least 0.1 weight percent chromium in the hexavalent state, and recovering a normally solid copolymer.

9. A process which comprises copolymerizing ethylene with 1-butene, the amount of 1-butene being in the range 10 to 20 weight percent based on total olefin, at a temperature in the range 175 to 275° F., in the presence of cyclohexane at a pressure in the range 150 to 350 p.s.i., with a catalyst prepared by impregnating a silica-alumina support with an aqueous solution of nickelous nitrate and chromium trioxide, drying, and calcining in substantially anhydrous air at a temperature in the range 750 to 1500° F. to activate said catalyst and result in at least part of the chromium being in the hexavalent state, the total content of chromium plus nickel in said catalyst being in the range 1 to 5 weight percent, the weight ratio of chromium to nickel being in the range 3:1 to 1:1, the catalyst containing at least 0.1 weight percent chromium in the hexavalent state, and recovering a normally solid copolymer.

10. A process which comprises copolymerizing ethylene with 1-butene, the amount of 1-butene being in the range 10 to 20 weight percent based on total olefin, at a temperature in the range 175 to 275° F., in the presence of cyclohexane at a pressure in the range 150 to 350 p.s.i., with a catalyst prepared by impregnating a silica-alumina support with an aqueous solution of cobaltous nitrate and chromium trioxide, drying, and calcining in substantially anhydrous air at a temperature in the range 750 to 1500° F. to activate said catalyst and result in at least part of the chromium being in the hexavalent state, the total content of chromium plus cobalt in said catalyst being in the range 1 to 5 weight percent, the weight ratio of chromium to cobalt being in the range 3:1 to 1:1, the catalyst containing at least 0.1 weight percent chromium in the hexavalent state, and recovering a normally solid copolymer.

References Cited in the file of this patent

UNITED STATES PATENTS

| | | |
|---|---|---|
| 2,728,758 | Field et al. | Dec. 27, 1955 |
| 2,825,721 | Hogan et al. | Mar. 4, 1958 |